United States Patent
Gaware et al.

(10) Patent No.: US 7,669,136 B1
(45) Date of Patent: Feb. 23, 2010

(54) INTELLIGENT ANALYSIS BASED SELF-SCHEDULING BROWSER REMINDER

(75) Inventors: Amit G. Gaware, Pune (IN); Teng Hu, Austin, TX (US); David P. Lee, Round Rock, TX (US); Ankur B. Shah, Surat (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/272,049

(22) Filed: Nov. 17, 2008

(51) Int. Cl.
*G06F 3/00* (2006.01)

(52) U.S. Cl. .................. 715/760; 715/866; 715/744; 715/789; 715/811

(58) Field of Classification Search .......... 715/760, 715/866, 744, 789, 811
See application file for complete search history.

(56) References Cited

U.S. PATENT DOCUMENTS

| | | | |
|---|---|---|---|
| 5,727,129 A | | 3/1998 | Barrett et al. |
| 5,848,412 A | | 12/1998 | Rowland et al. |
| 6,100,890 A | * | 8/2000 | Bates et al. ............... 715/826 |
| 6,292,792 B1 | | 9/2001 | Baffes et al. |
| 6,297,819 B1 | * | 10/2001 | Furst ........................ 715/733 |
| 6,363,352 B1 | * | 3/2002 | Dailey et al. ................. 705/9 |
| 6,415,319 B1 | * | 7/2002 | Ambroziak ............... 709/219 |
| 6,594,682 B2 | | 7/2003 | Peterson et al. |
| 6,904,408 B1 | | 6/2005 | McCarthy et al. |
| 7,127,473 B2 | * | 10/2006 | Agassi et al. ........... 707/103 R |
| 2002/0147805 A1 | * | 10/2002 | Leshem et al. ............. 709/223 |
| 2002/0198882 A1 | * | 12/2002 | Linden et al. ................ 707/10 |
| 2003/0074635 A1 | * | 4/2003 | Cao ........................... 715/513 |
| 2004/0031856 A1 | * | 2/2004 | Atsmon et al. ............. 235/492 |
| 2004/0043758 A1 | * | 3/2004 | Sorvari et al. ............ 455/414.1 |
| 2004/0061716 A1 | * | 4/2004 | Cheung et al. ............. 345/710 |
| 2004/0122947 A1 | * | 6/2004 | Banerjee et al. ............ 709/225 |
| 2004/0261026 A1 | * | 12/2004 | Corson ...................... 715/704 |
| 2004/0267943 A1 | * | 12/2004 | Ryu ........................... 709/228 |
| 2005/0028104 A1 | * | 2/2005 | Apparao et al. ............ 715/738 |

(Continued)

FOREIGN PATENT DOCUMENTS

CN 101364231 9/2008

(Continued)

OTHER PUBLICATIONS

Althoff, F. et al., A Generic Approach for Interfacing VRML Browsers to Various Input Devices and Creating Customizable 3D Applications (2002).

(Continued)

*Primary Examiner*—Weilun Lo
*Assistant Examiner*—Tuyetlien T Tran
(74) *Attorney, Agent, or Firm*—Weitzman Law Offices, LLC; Kenneth S. Weitzman

(57) ABSTRACT

A computer-implemented method for reminding a user to browse a regularly visited website comprising tracking websites visited by the user and ranking each website by visitation frequency and browsing duration. An average recurring time each website is visited is calculated and it is determined whether the current time is equal to the average recurring time for a particular website. The user is reminded to visit the particular website if it is determined that the user is not currently browsing the particular website when the current time equals the average recurring time for the particular website.

1 Claim, 3 Drawing Sheets

U.S. PATENT DOCUMENTS

| | | | |
|---|---|---|---|
| 2005/0091262 A1* | 4/2005 | Cao ........................... | 707/102 |
| 2005/0223093 A1* | 10/2005 | Hanson et al. .............. | 709/224 |
| 2006/0059225 A1* | 3/2006 | Stonehocker et al. ....... | 709/202 |
| 2006/0259867 A1* | 11/2006 | Watson et al. ............... | 715/760 |
| 2007/0168342 A1* | 7/2007 | Singerman et al. ............ | 707/5 |
| 2007/0203906 A1* | 8/2007 | Cone et al. .................... | 707/6 |
| 2007/0255754 A1* | 11/2007 | Gheel ...................... | 707/104.1 |
| 2008/0005672 A1 | 1/2008 | Mestres et al. | |
| 2008/0133540 A1* | 6/2008 | Hubbard et al. ............... | 707/10 |
| 2008/0306959 A1* | 12/2008 | Spivack et al. ................ | 707/9 |
| 2009/0077203 A1 | 3/2009 | Janik | |
| 2009/0100066 A1* | 4/2009 | McAfee ....................... | 707/10 |
| 2009/0164903 A1* | 6/2009 | Patel .......................... | 715/721 |

FOREIGN PATENT DOCUMENTS

| | | |
|---|---|---|
| KR | 2008080425 | 9/2004 |

OTHER PUBLICATIONS

King, P. et al., Behavioral Reactivitiy and Real Time Programming in XML (2004).
Joarder, MMA, An adaptive Web browser, INSPEC AN-8530836 (2004).
"The Platform for Privacy Preference as a Social Protocol: An Examination Within the U.S. Policy Context", Harry Hochheiser, ACM Transactions on Internet Technology, vol. 2, No. 4, Nov. 2002, pp. 276-306.
Kammenhuber et al.; "Web Search Clickstreams," 2006.
Nasraoui et al.i "Using Retrieval Measures to Assess Similarity in Mining Dynamic Web Clickstreams," 2005.
Hochheiser "The Platform for Privacy Preference as a Social Protocol: an Examination Within the U.S. Policy Context" ACM Transactions on Internet Technology, vol. 2, No. 4, Nov. 2002, pp. 276-306.
English language Abstract of KR2008080425.
English language Abstract of CN101364231 (2004).

* cited by examiner

INTELLIGENT ANALYSIS BASED SELF-SCHEDULING BROWSER REMINDER

BACKGROUND

1 Field of the Invention

This application relates generally to computer software, and more particularly, to an intelligent self-scheduling browser reminder to view content based on previous web browsing behavior.

2. Description of Related Art

People throughout the world use the Internet daily to read news and obtain information from a wide variety of sources. The Internet is inundated with information catering to diverse interests.

People often view content on specific websites on a regular schedule or frequency. For example, an investor may check the stock prices on a particular website in the investor's portfolio each day after the market closes, or a sports fan may regularly view a particular sports website on a particular day for scores or list of players.

The web browsers used to search the Internet may be accompanied with computer programs that interact with the browser to provide specific functions on demand. These computer programs (e.g., plug-ins, extensions, etc.) add new features not foreseen when the browser was initially developed. The source code may be kept separate from the browser's source code allowing third party developers to create new capabilities for the browser notwithstanding incompatible software licenses.

SUMMARY

In one aspect of this disclosure, a computer-implemented method is disclosed for reminding a user to browse a regularly visited website. The method comprises tracking websites visited by the user and ranking each website by visitation frequency and browsing duration. An average recurring time each website is visited is calculated and it is determined whether the current time is equal to the average recurring time for a particular website. The user is reminded to visit the particular website if it is determined that the user is not currently browsing the particular website when the current time equals the average recurring time for the particular website.

The foregoing has outlined generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

A more complete understanding of this application can be obtained when the following detailed description is considered in conjunction with the following drawings, in which:

FIG. 1 is a schematic of an illustrative computer system for executing the intelligent self-scheduling browser plug-in;

DETAILED DESCRIPTION

Figure 1:
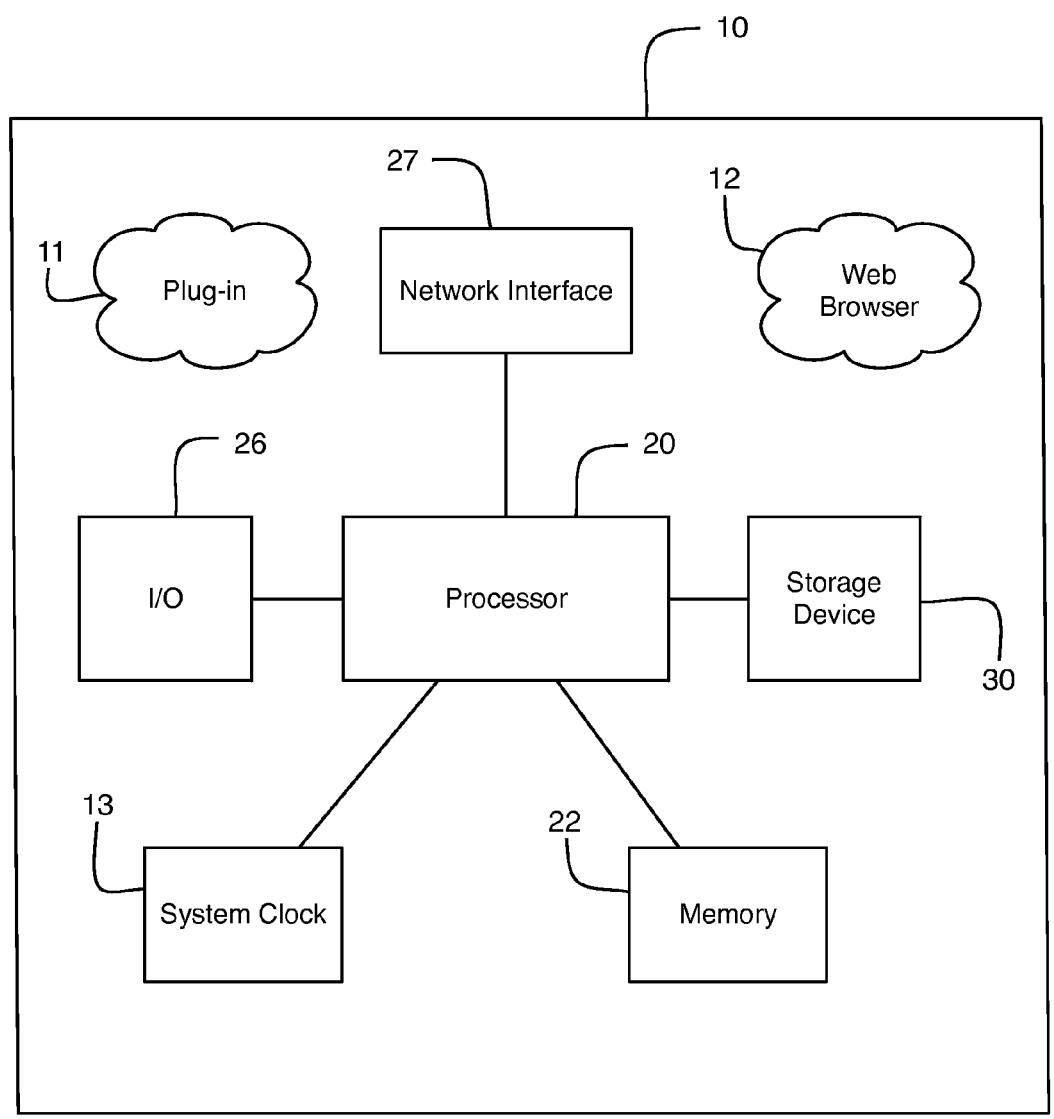

This disclosure describes a system and method for implementing an intelligent, analysis based self-scheduling browsing reminder that will prompt users to browse their favorite websites or other applications at particular recurring times. As will be appreciated by one skilled in the art, the present application may be embodied as a system, method or computer program product. Accordingly, the present application may take the form of an entirely hardware embodiment, an entirely software embodiment (including firmware, resident software, micro-code, etc.) or an embodiment combining software and hardware aspects that may all generally be referred to herein as a "system."

Furthermore, the present application may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory, a read-only memory, an erasable programmable read-only memory (e.g., EPROM or Flash memory), an optical fiber, a portable compact disc read-only memory, an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in base band or as part of a carrier wave. The computer usable program code may be transmitted using any appropriate medium, including but not limited to wireless, wire line, optical fiber cable, RF, etc.

Computer program code for carrying out operations of the present application may be written in any combination of one or more programming languages, including an object oriented programming language such as Java, Python, Delphi, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

This application is described below with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, an illustrative computer system 10 is shown for implementing an intelligent analysis based self-scheduling browsing reminder that tracks the uniform resource locators ("URL") visited by a user, prepares a web browsing profile for that user, and prompts the user to visit one of her favorite websites based on the data gathered in her profile. While the reminder is preferably embodied as a plug-in 11, it is understood that the reminder may be encoded as an extension or a separate program. The profile will preferably contain a list of visited websites ranked by visitation frequency and browsing duration. The accumulated data will provide plug-in 11 with the intelligence needed to remind users to visit one of their favorite websites or other applications. The reminder schedule for each website may be determined by, for example, averaging the time the user visits the website. While plug-in 11 is shown to interact with web browser 12, it is understood that plug-in 11 may interact with any other application to gather frequency data and remind users to open that application at certain times. Computer system 10 may be implemented on a stand-alone device or within a network environment via network interface 27.

Computer system 10 preferably includes at least a processing unit 20, memory 22, input/output ("I/O") interface 26, storage device 30, and system clock 13, all which operate in a conventional manner. Plug-in 11 provides the function of the present disclosure by preferably loading into memory 22 and having its instructions executed by processor 20. Plug-in 11 may be part of the operating system for best efficiency. Alternatively, the operating system may invoke one or more separate software applications to employ plug-in 11. One skilled in the art will recognize that an implementation of an actual computer may contain additional components and that FIG. 1 contains a high level representation of some of the components of such a computer for illustrative purposes.

Figure 2:
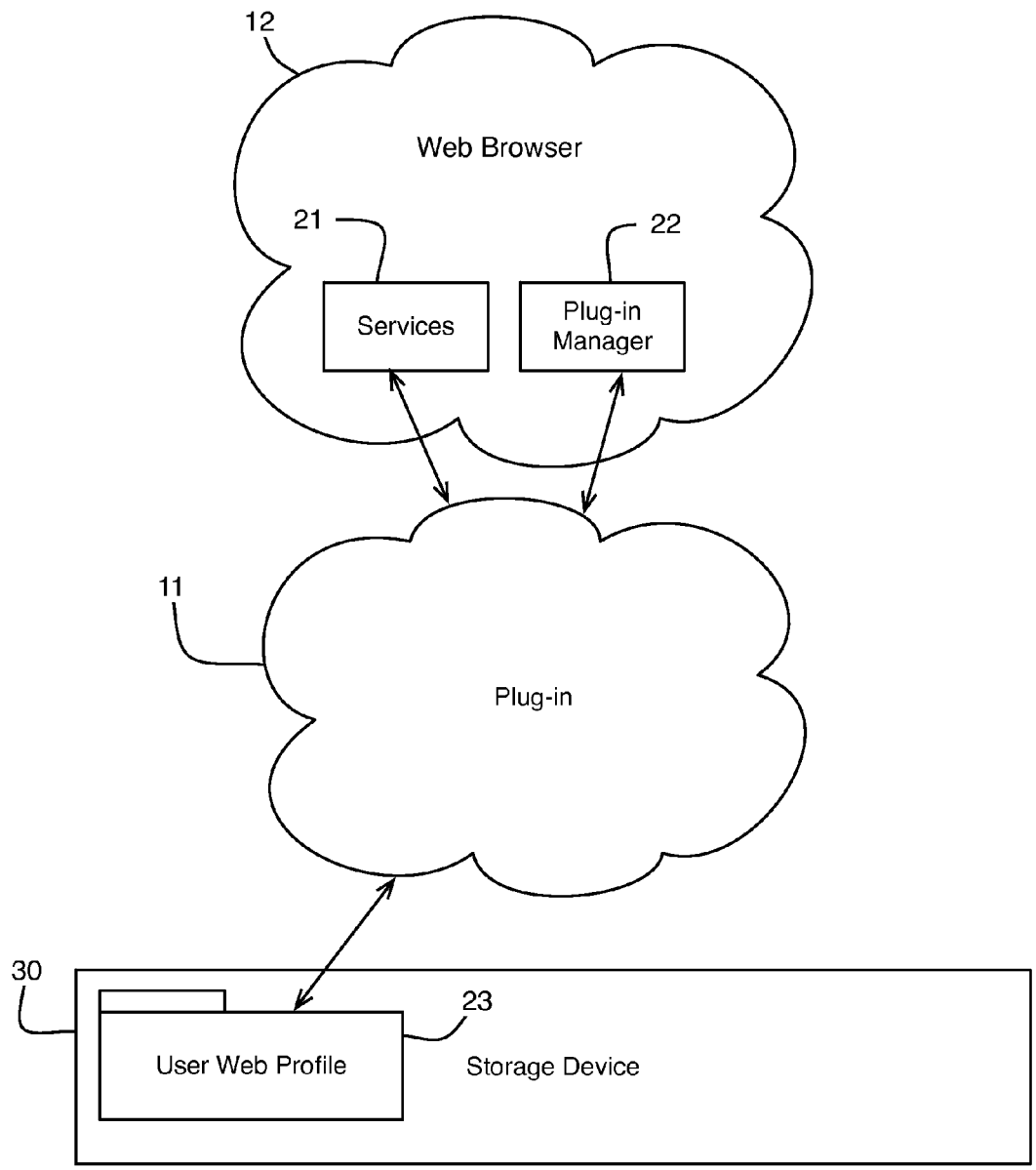
FIG. 2 is a schematic of an illustrative logical link between the self-scheduling browser plug-in and a web browser.

Referring to FIG. 2, a preferred logical arrangement between plug-in 11 and web browser 12 is illustrated. Web browser 12 preferably provides services 21 that plug-in 11 can use, such as, for example, a mechanism for plug-in 11 to register with plug-in manager 22 and a protocol by which data may be exchanged between web browser 12 and plug-in 11. Plug-in 11 preferably utilizes an application programming interface ("API") to communicate with web browser 12.

Once plug-in 11 registers with plug-in manager 22, plug-in 11 may start monitoring the user's web browsing activity via the API interface. Plug-in 11 may use conventional web tracking techniques (e.g., cookie tracking, URL query string tracking, etc.). Plug-in 11 may store the tracking information in a user web profile 23 on a computer storage device (e.g., storage device 30). User web profile 23 may contain the URL the user browsed accompanied by a timestamp indicating the date and time the user visited the URL. Additionally, each URL may be associated with the average amount of time the user spent browsing the URL. Plug-in 11 preferably scans the data accumulated in web profile 23 and preferably ranks the websites based on visitation frequency and browsing duration.

Figure 3:
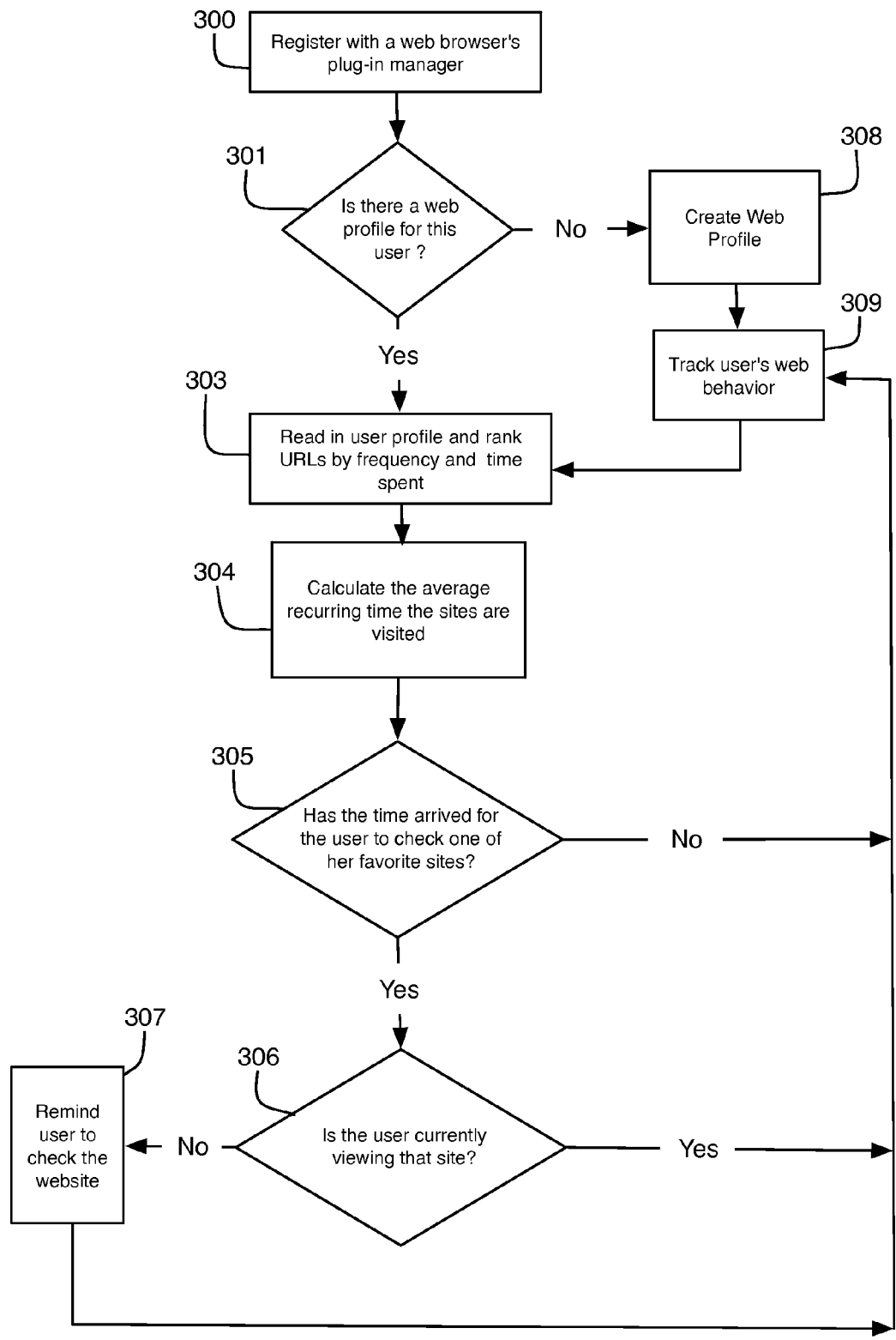
FIG. 3 is a flowchart illustrating a preferred sequence of steps for gathering user browser data and scheduling reminders to the user.

FIG. 3 illustrates a preferred sequence of steps to be executed by plug-in 11 that will automatically remind users to check their favorite websites or other applications. In step 300, plug-in 11 preferably registers itself with a web browser's plug-in manager. The plug-in 11 then preferably checks for a user profile in step 301. If a user profile does not exist, plug-in 11 preferably creates a user web profile at step 308 and begins tracking the user's web behavior at step 309. In step 309, the plug-in 11 accumulates the information regarding the websites or applications visited, including, but not limited to, the time of the visits and the browsing duration on each site. Other information regarding the websites or applications visited may be collected, such as, for example, weekend activities, lunchtime activities and/or holiday activities.

If there is already a web profile for the user in step 301 or after a web profile has been created in step 308, plug-in 11 preferably reads in the accumulated data from the user profile and begins ranking the URLs by, for example, frequency and browsing duration in step 303. In step 304, the plug-in 11 preferably calculates the average recurring time the favorite websites or other applications are visited. Plug-in 11 may use a variety of known data structures within memory 22 (e.g., arrays, linked lists, etc.) to sort the ranking of the websites and to store the average time the websites are visited.

In step 305, plug-in 11 preferably compares the current time provided by system clock 13 to the average time calculated in step 304 to confirm whether to remind the user to check her favorite website. If the time has not yet arrived, plug-in 11 preferably loops back to step 309 and continues tracking the user's web behavior. If the time has arrived, plug-in 11 preferably verifies whether the user is currently visiting that site in step 306. If the user is currently visiting the site, plug-in 11 preferably loops back to step 309 and continues to track the user's web behavior. If the user is not currently visiting that site, plug-in 11 preferably initiates a reminder to the user to check that particular site at step 307. It is understood that plug-in 11 may use a variety of different ways to remind the user to check the website (e.g., pop-up screen, voice, sound, etc.). The user may be given an option to go to the particular URL associated with the website or application, cancel the reminder if the user does not wish to go to that URL, and/or delay the operation via a "snooze" function to permit the plug-in 11 to remind the user again in a predetermined time (e.g., 5 minutes). Once the reminder is dispatched at step 307, plug-in 11 preferably loops back to step 309 to continue the process. Plug-in 11 is preferably executed indefinitely until computer system 10 is turned off, the user exits web browser 12, the user turns off plug-in 11, or the number of reminders exceed a predefined threshold in a given period of time.

While this disclosure has been described in terms of tracking a user's history of regularly visiting websites, it is understood that this disclosure is equally applicable to tracking a user's application/software-usage to remind a user to timely work on a particular application/software.

The flowchart and block diagrams in the figures illustrate the architecture, functionality, and operation of possible implementations of systems, methods and computer program products according to various embodiments of the present application. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A computer-implemented method for reminding a user to browse a regularly visited website, comprising:
    tracking websites visited by the user;
    ranking each website by visitation frequency and browsing duration;
    calculating an average recurring time each website is visited;
    determining whether the current time is equal to the average recurring time for a the particular website;
    determining whether the user is currently browsing the particular website when the current time equals the average recurring time for the particular website; and
    reminding the user to visit the particular website with an audio cue if it is determined that the user is not currently browsing the particular website when the current time equals the average recurring time for the particular website.

* * * * *